(12) United States Patent
Ma

(10) Patent No.: US 10,225,301 B2
(45) Date of Patent: Mar. 5, 2019

(54) METHOD AND APPARATUS FOR USE OF INPUT MESSAGES IN MEDIA TRANSPORT TO SUPPORT INTERACTIVE COMMUNICATIONS

(71) Applicant: Zhan Ma, Fremont, CA (US)

(72) Inventor: Zhan Ma, Fremont, CA (US)

(*) Notice: Subject to any disclaimer, the term of this patent is extended or adjusted under 35 U.S.C. 154(b) by 65 days.

(21) Appl. No.: 15/249,273

(22) Filed: Aug. 26, 2016

(65) Prior Publication Data

US 2017/0063950 A1 Mar. 2, 2017

Related U.S. Application Data

(60) Provisional application No. 62/210,002, filed on Aug. 26, 2015.

(51) Int. Cl.

| G06F 15/16 | (2006.01) |
|---|---|
| H04L 29/06 | (2006.01) |
| H04L 29/08 | (2006.01) |
| G06F 13/42 | (2006.01) |
| H04N 19/117 | (2014.01) |
| H04N 19/159 | (2014.01) |
| H04N 19/61 | (2014.01) |
| H04N 19/13 | (2014.01) |
| H04N 19/15 | (2014.01) |
| H04N 19/513 | (2014.01) |

(52) U.S. Cl.
CPC .......... *H04L 65/60* (2013.01); *G06F 13/4282* (2013.01); *H04L 67/06* (2013.01); *H04L 69/326* (2013.01); *H04N 19/117* (2014.11); *H04N 19/159* (2014.11); *H04N 19/61* (2014.11); *H04N 19/13* (2014.11); *H04N 19/15* (2014.11); *H04N 19/513* (2014.11)

(58) Field of Classification Search
CPC .... H04N 19/159; H04N 19/117; H04N 19/61; H04N 19/13; H04N 19/15; H04N 19/513; H04L 61/2592; H04L 65/60; H04L 67/06; H04L 69/326; G06F 13/4282
See application file for complete search history.

(56) References Cited

U.S. PATENT DOCUMENTS

| 10,116,997 | B2* | 10/2018 | Rhyu | H04N 21/643 |
|---|---|---|---|---|
| 2004/0002993 | A1* | 1/2004 | Toussaint | G06F 17/30038 |
| 2004/0267742 | A1* | 12/2004 | Polson | G11L 327/11 |
| 2005/0275637 | A1* | 12/2005 | Hinckley | A63F 13/06 |
| | | | | 345/173 |
| 2006/0174021 | A1* | 8/2006 | Osborne | H04L 65/608 |
| | | | | 709/230 |
| 2007/0183493 | A1* | 8/2007 | Kimpe | G06F 21/6245 |
| | | | | 375/240.1 |
| 2010/0125880 | A1* | 5/2010 | Roewe | H04H 20/38 |
| | | | | 725/87 |
| 2010/0277411 | A1* | 11/2010 | Yee | G06F 3/017 |
| | | | | 345/156 |

(Continued)

Primary Examiner — Benjamin M Thieu

(57) ABSTRACT

A method and apparatus for use of input messages in the media transport to support and improve the interactive communication between a media content server and an end user is disclosed. In one embodiment, the input message is encapsulated into any existing media transport protocol. In another embodiment, several types of the input messages are defined to deliver information and requests relating to interactions between the end user and the media content server.

7 Claims, 6 Drawing Sheets

(56) References Cited

U.S. PATENT DOCUMENTS

| | | | | |
|---|---|---|---|---|
| 2013/0159233 A1* | 6/2013 | Mason | ............... | G06F 17/30864 |
| | | | | 706/45 |
| 2013/0159298 A1* | 6/2013 | Mason | ............... | G06F 17/30864 |
| | | | | 707/728 |
| 2013/0298253 A1* | 11/2013 | Hwang | ................... | H04L 63/10 |
| | | | | 726/26 |
| 2014/0098811 A1* | 4/2014 | Bouazizi | ............. | H04L 65/4084 |
| | | | | 370/389 |
| 2016/0065637 A1* | 3/2016 | O'Malley | ............. | H04L 67/306 |
| | | | | 709/231 |
| 2016/0110953 A1* | 4/2016 | Sotiriou | .............. | G07F 17/3225 |
| | | | | 463/25 |
| 2016/0226939 A1* | 8/2016 | Kwak | ................ | H04L 65/4076 |

* cited by examiner

METHOD AND APPARATUS FOR USE OF INPUT MESSAGES IN MEDIA TRANSPORT TO SUPPORT INTERACTIVE COMMUNICATIONS

CROSS-REFERENCE TO RELATED APPLICATIONS

This application claims the benefit of the filing date of the following U.S. Provisional Application, which is hereby incorporated by reference in its entirety for all purposes: Ser. No. 62/210,002, filed on Aug. 26, 2015, and titled "Method and Apparatus for Smart Media Transport."

TECHNICAL FIELD

This invention relates generally to the media transport, and more specifically to a method and an apparatus for use of the input messages in media transport to support interactive communications.

BACKGROUND

Media transport is a key component of media delivery between the content provider and the end consumer. Given that nowadays video consumes most of Internet traffic, we hereby use video as a representative of the media of all formats. The present principles can be applied to other media formats, such as audio.

Media transport has been an area of great interest in both academia and industry. Several international industrial standard specifications have been developed to provide guidance for implementation, such as MPEG-2 Transport System (TS), Dynamic Adaptive Streaming over HTTP (DASH), HTTP Live Streaming (HLS), and MPEG Media Transport (MMT). Some of these specifications have already been implemented in existing systems, such as YouTube and Netflix. However, these standard specifications mainly focus on the forward streaming protocol/architecture, i.e., communications from the content provider (or the cloud edge server) to the end user. In other words, the legacy media transport schemes mainly focus on the one-way (unidirectional) communication.

Recent advances in media delivery and consumption demonstrate that two-way (bidirectional) communications such as virtual reality interaction are desirable. Thus, not only the forward streaming (e.g., from the media server or the cloud edger server to the end user), but also the backward feedback inputs (e.g., from the end user to the media server or the cloud edge server) are needed for the next generation of media transport. Our invention discloses several input messages that could be introduced and implemented into the existing media transport schemes to refine and improve the interactive media transport.

BRIEF SUMMARY

In one embodiment, a method for use of the input messages in the feedback channel of media transport is provided to refine and improve the interactive media transport.

In another embodiment, a method is provided to define types of the input messages that can be used in the interactive media transport, including for example, the keyboard/mouse messages, USB messages, audio/speech messages, video messages, region-of-interest messages, quality-of-experience messages, and 3-D space location messages. Additional input messages can be used to carry other information from the end user to the media server in connection with interactive communication. These messages can be encapsulated into the existing media transport protocol, such as MMT.

DETAILED DESCRIPTION

The present principles are directed to the interactive media transport using the input messages in the feedback channel to deliver user information and requests to the content server or cloud edge server.

The following discussions of various embodiments and the principles are by way of illustration only and should not be constructed in any way to limit the scope of the disclosure. The principles of the present disclosure can be adapted to other media technologies, standards, recommendations and extensions thereof, and may also be applied to other types of media content.

Media transport systems have been specified in several industrial standards. They typically transport time aligned audio-visual data segments from the server to the end user with additional data such as subtitles. The input messages are introduced to the existing media transport systems to enable the feedback control for interactive communications between the content server and the user. It can be encapsulated in any widely accepted media transport system, such as MMT. Note that messages having different names but carrying similar user's information and requests to the content server (or the cloud edge server) and serving similar purpose of improving the server-user interaction can be used. The particular input messages discussed here are for illustration only and are not limiting the present principles in any away.

Figure 1:
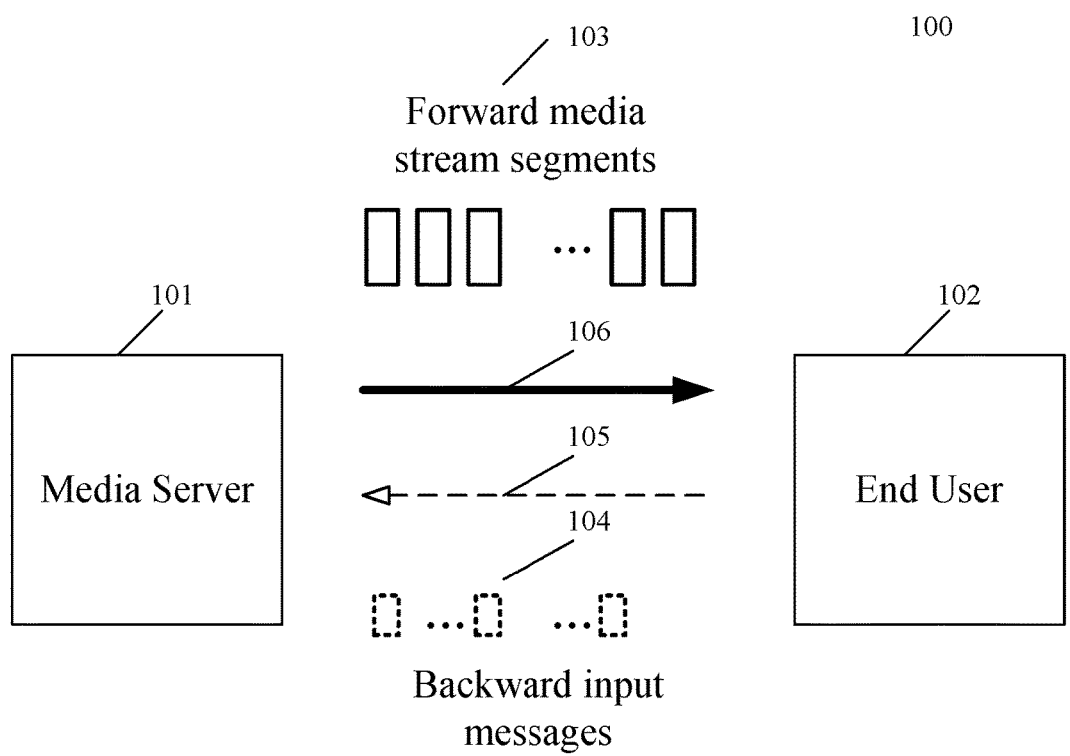
FIG. 1 is a diagram illustrating an interactive media transport process, according to an exemplary embodiment of the present principles.

FIG. 1 illustrates the basic scheme of two-way (bidirectional) media transport that refines and improves the interactive communication according one embodiment of the present disclosure. The embodiment shown in FIG. 1 is illustrative and other embodiments could be used without departing from the scope of this disclosure.

Specifically, the media server 101 prepares and sends the media content into media stream segments 103 to the end user 102 for consumption through forward link 106. Media content is typically sliced into the segments 103 and encapsulated into such segments using any widely accepted transport protocols or standards (such as TS, MMT, HLS) at step 106. For media content that comprises time-elapsed media sequences, the media stream segments 103 typically refer to the media frame or media slice (e.g., video frame or slice). Media content is delivered to the end user 102 and consumed by the end user 102 through for instance, video streaming from the YouTube or Netflix server over the Internet. The end user 102 uses the feedback channel 105 to send the backward input messages 104 to the media server 101. The media server 101 then respond to the user information and requested contained the input messages with appropriate actions.

Figure 2:
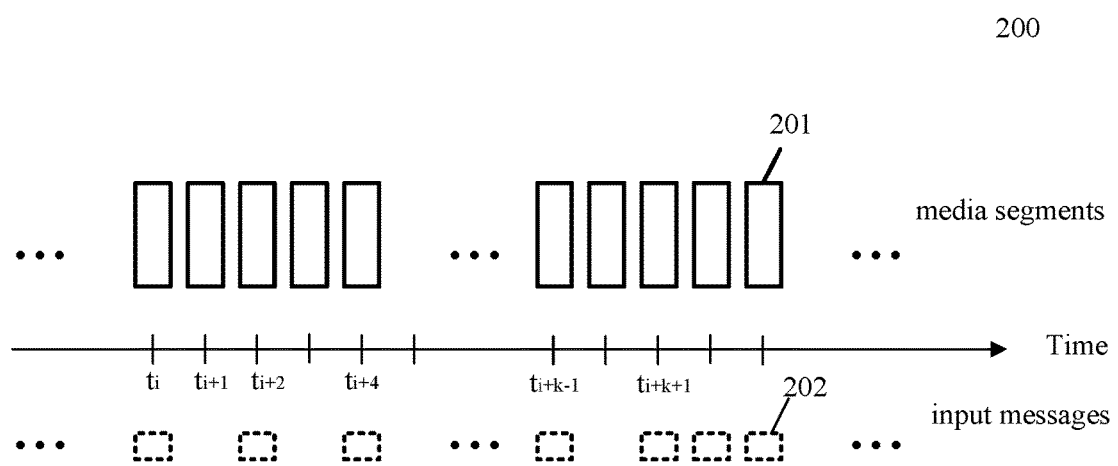
FIG. 2 is a diagram illustrating an exemplary method for inserting the input messages into the feedback stream fragments, according to an exemplary embodiment of the present principles.

FIG. 2 illustrates the basic structure of the forward media stream segments and backward input messages in a time sequence.

Forward media stream segments from the content server to the end user (such as 201) is typically time aligned and continuous (at continuous time points, $t_i \ldots t_{i+k} \ldots$). For example, a video frame segment is about 33 milliseconds for a 30 Hertz video stream. In contrast, backward input messages 202 are not time aligned. They are typically associated with on-demand requests. For instance, an end user can invoke the keyboard typing at any time (such as at time point $t_{i+k-1}$), and close such session when finishing the text input (such as $t_{i+k+1}$). Once the input messages are sent to the media server, the server will respond accordingly and stream the proper segments in response to the user's on-demand requests associated with such input message. The media server, for example, can overlay user's typed texts with the media content and send it to the user for display.

In the present principles of using input message for interactive communication between the media server and the end user, input messages are generally defined to carry typical information in connection with user-server interactions, including for example, the keyboard message that can be used to carry the appropriate keys (single or combined) for user's typing. The content server 101 will respond to such keyboard messages with appropriate actions.

Another example of such input messages can be a mouse message, which can be used to carry the instant mouse location (e.g., location (x, y) in a 2-D plane), mouse instructions (left, right or other buttons) and its trajectory if applicable. The content server will respond to such mouse message with appropriate actions.

Another example of such input messages is an audio-visual message (e.g., audio, speech, video), which can be used to deliver certain audio-visual information from the end user to instruct the content server to respond to certain requests. For instance, an end user could use the speech command to communicate with the content server instead of using the legacy point-and-click or text typing.

Another example of such input messages is a region of interest message, such as 3-D space coordinates (x, y, z) of an object, which can be used to locate and track the 3-D object movement, trajectory, and gesture for the real-time interaction. For instance, such 3-D coordinate messages can be used by the recent Virtual Reality systems to transmit the hand, leg, head and body positions of the user in a 3-D space for a full-duplex interaction.

Another example of such input messages is a USB message, which can be used to carry the information for file transfer from the end user to the content server. Other input messages are reserved for future extension to carry other information from the end user to the media server in connection with user-server interactive communication.

Figure 3:
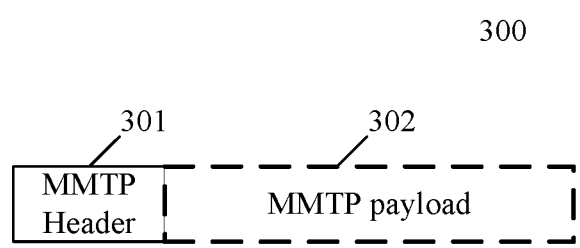
FIG. 3 is a diagram illustrating an exemplary structure of a MMT protocol packet, which can be used to deliver feedback input messages according to an exemplary embodiment of the present principles.

These messages can be encapsulated in any existing media transport protocol, such as MMT protocol. By way of example, FIG. 3 illustrates the typical MMT packet 300 containing an MMTP header 301 and an MMTP payload 302. The MMTP payload 302 can be used to carry the input messages described above.

Further, as an example of the input messages, the keyboard message can be encapsulated using the MMTP protocol as shown in Table 1 below.

TABLE 1

Keyboard Message Using MMTP protocol

| Syntax | Value | No. of bits |
|---|---|---|
| keyboard_message ( ) { | | |
|   message_id | | 16 |
|   version | | 8 |
|   length | | 16 |
|   extension { | | |
|     reserve | '111' | 7 |
|     extension_flag | '1111' | 1 |
|   } | | |
|   message_payload { | | |
|     key_type | | 8 |
|     key_data | | 32 |
|     if(extension_flag == 1) { | | |
|       extension | | |
|     } | | |
|   } | | |
| } | | |

Specifically, the field message_id indicates the identifier of the keyboard messages; version indicates the version of the keyboard messages. The field length is a 16-bit field to covey the length of the keyboard message in bytes, counting from the beginning of the next field to the last byte of the keyboard message. The value '0' is not valid for the length field. The filed extension_flag indicates whether extension exists. If the value is set to 1, the content of extension is present. The filed extension provides extension information for signaling messages that require extension. The content and length of this field are specified for these signaling messages. The field key_data indicates the exact data of the pressed key. The field of key_type indicates the type of interactive data as further shown in Table 2. Other types of input messages can be encapsulated in similar ways to the MMT protocol. Further, the input messages can be encapsulated into other media transport protocols and systems.

TABLE 2 value of key_type

| Value | description |
|---|---|
| 0x0000 | To notify key press event |
| 0x0001 | To notify key release event |
| 0x0002 | To indicate keyboard leads value |
| 0x0007~0x7FFF | Reserved for ISO |
| 0x80000~0xFFFF | Reserved for private |

Figure 4:
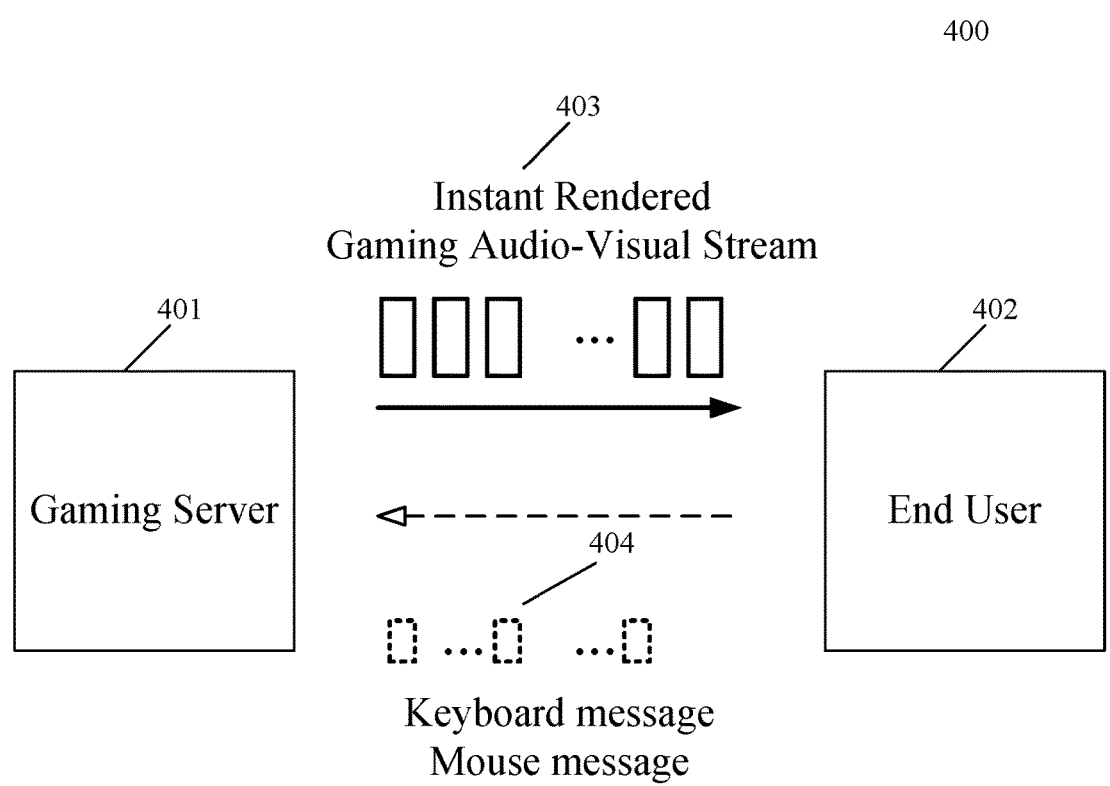
FIG. 4 is a diagram illustrating an exemplary method for applying the input message in a transport protocol to support interactive gaming, according to an exemplary embodiment of the present principles.

FIG. 4 illustrates an exemplary use case of the present principles to provide user-server interaction in a gaming system 400. The input messages are used to carry the commands 404 (such as keyboard message, mouse message) from the end user 402 to the gaming server 401. Both keyboard and mouse messages 404 are used to guide the avatar in the game to perform the appropriate movement, such as running, jumping, drawing, or fighting. Instant rendered visual screen and audio effects are combined at 403, and sent to the end user 402 by the gaming server 301. Additional types and formats of input messages, such as audio-visual messages, region of interest messages and USB messages are not illustrated in FIG. 4, but they can be readily applied at 404 to the gaming system 400.

Figure 5:
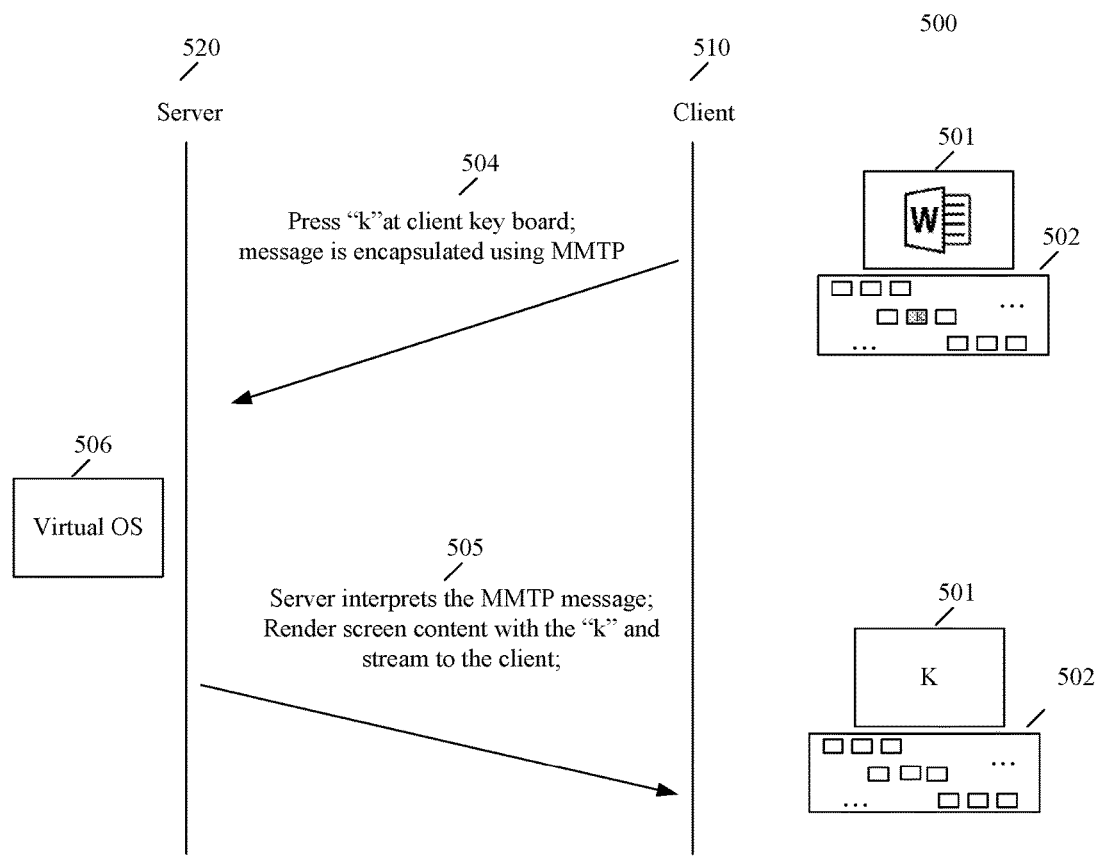
FIG. 5 diagram illustrating an exemplary interactive media based remote screen control, according to an exemplary embodiment of the present principles.

FIG. 5 illustrates anther exemplary use case of an interactive media based remote screen control system 500. Such system 500 includes the server 520 and the client system 510. The client system 510 comprises typical computer components, such as keyboard 502 and display screen subsystem 501. The server 520 hosts a virtualized operation system (OS) 506, which could be used by the client 510 to perform different tasks at the server side, including typical office work, such as word editing or slides preparation. At 504, the client system 510 starts communicating with the server by pressing the "k" key when editing the word document on the virtualized OS at server side; keyboard message with "k" is captured and encapsulated using the MMTP syntax as described above and sent to the server side. At step 505, the server receives the MMTP packet including the keyboard message and interprets the keyboard message accordingly; screen is instantly rendered and streamed to the client; "k" is then displayed at client screen.

Figure 6:
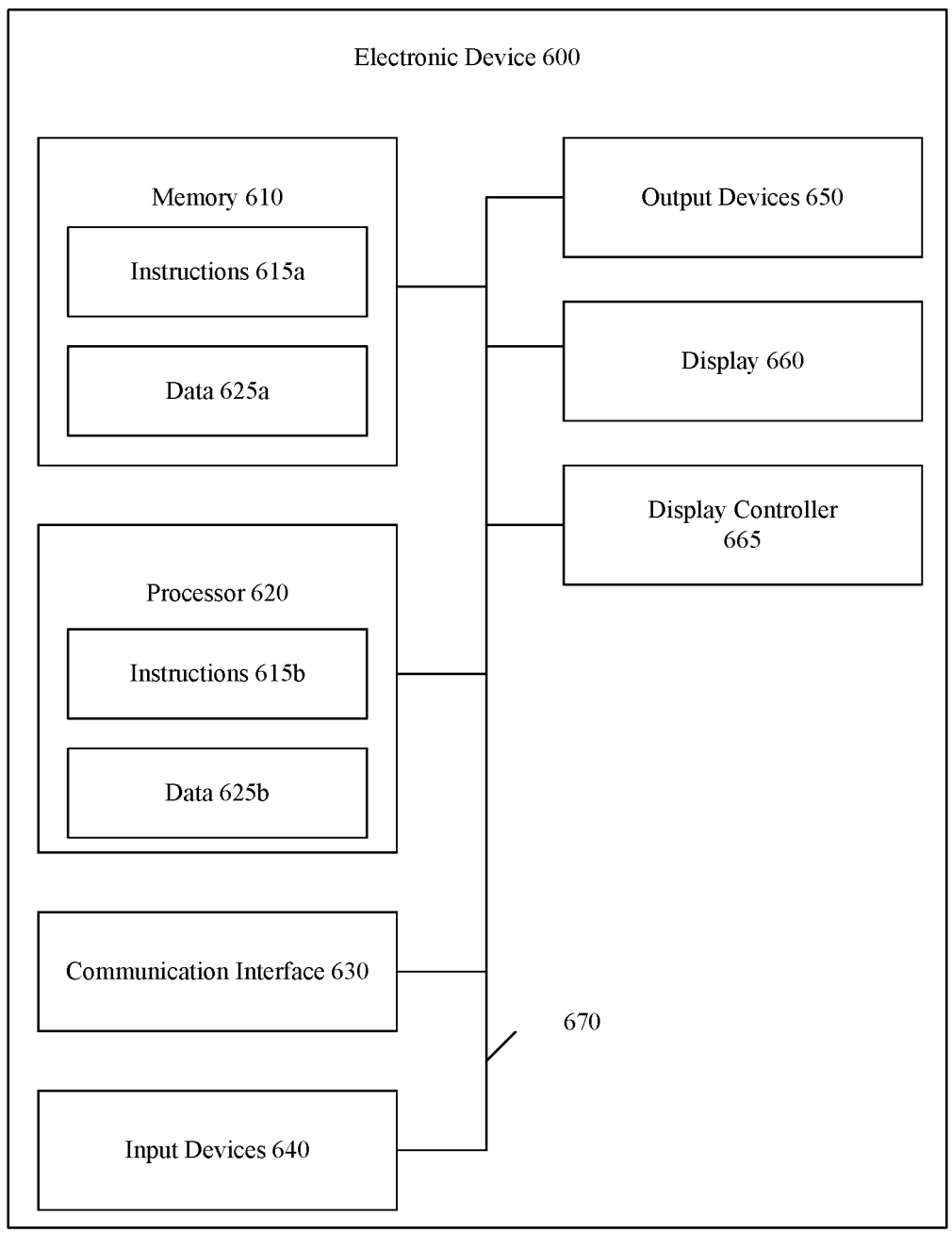
FIG. 6 is a diagram illustrating various components that may be utilized in an exemplary embodiment of the electronic devices wherein the exemplary embodiment of the present principles can be applied.

FIG. 6 illustrates various components that may be utilized in an electronic device 600.

The electronic device 600 may be implemented as one or more of the electronic devices (e.g., electronic devices 101, 102, 401, 402, 520, 510) described previously.

The electronic device 600 includes a processor 620 that controls operation of the electronic device 600. The processor 620 may also be referred to as a CPU. Memory 610, which may include both read-only memory (ROM), random access memory (RAM) or any type of device that may store information, provides instructions 615a (e.g., executable instructions) and data 625a to the processor 620. A portion of the memory 610 may also include non-volatile random access memory (NVRAM). The memory 610 may be in electronic communication with the processor 620.

Instructions 615b and data 625b may also reside in the processor 620. Instructions 615b and data 625b loaded into the processor 620 may also include instructions 615a and/or data 625a from memory 610 that were loaded for execution or processing by the processor 620. The instructions 615b may be executed by the processor 620 to implement the systems and methods disclosed herein.

The electronic device 600 may include one or more communication interfaces 630 for communicating with other electronic devices. The communication interfaces 630 may be based on wired communication technology, wireless communication technology, or both. Examples of communication interfaces 630 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, a wireless transceiver in accordance with $3^{rd}$ Generation Partnership Project (3GPP) specifications and so forth.

The electronic device 600 may include one or more output devices 650 and one or more input devices 640. Examples of output devices 650 include a speaker, printer, etc. One type of output device that may be included in an electronic device 600 is a display device 660. Display devices 660 used with configurations disclosed herein may utilize any suitable image projection technology, such as a cathode ray tube (CRT), liquid crystal display (LCD), light-emitting diode (LED), gas plasma, electroluminescence or the like. A display controller 665 may be provided for converting data stored in the memory 610 into text, graphics, and/or moving images (as appropriate) shown on the display 660. Examples of input devices 640 include a keyboard, mouse, microphone, remote control device, button, joystick, trackball, touchpad, touchscreen, lightpen, etc.

The various components of the electronic device 600 are coupled together by a bus system 670, which may include a power bus, a control signal bus and a status signal bus, in addition to a data bus. However, for the sake of clarity, the various buses are illustrated in FIG. 6 as the bus system 670. The electronic device 600 illustrated in FIG. 6 is a functional block diagram rather than a listing of specific components.

It should be noted that one or more of the methods described herein may be implemented in and/or performed using hardware. For example, one or more of the methods or approaches described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claim.

The invention claimed is:

1. A system for processing input messages from one or more remote client devices comprising:
   one or more remote client devices connected to a network, wherein one of said remote client devices are configured to capture user interaction input comprising keyboard input mouse input voice input and other user input; one of said remote client devices is configured to encapsulate user interaction input using one of existing media transport protocols into one or more input messages;
   wherein said one input message comprising a keyboard message, said keyboard message comprising a 16-bit message ID field that indicates an identifier of the keyboard message; a 8-bit version field that indicates a version number of the keyboard message; a 16-bit length field that indicates the length of the keyboard message; an 1-bit extension field that indicates presence of the message extension; a 8-bit key type field that indicates a specific type of typed key; a 32-bit key data field that indicates a value of typed key;
   wherein said 8-bit key type field is selected from the group comprising a key press event; a key release event; and a keyboard leads value;
   a server connected with one or more remote client devices, said server receiving said one or more input message from said remote client devices, said server is configured to interpret said one or more input message to provide instructions to render a visual scene; said server further configured to execute the instructions and to deliver the visual scene to said one or more remote client device.

2. The system of claim 1, wherein said existing media transport protocols comprise RTP, RTMP, and RTSP.

3. The system of claim 1, wherein said keyboard input message carrying information of a single key or combined keys.

4. The system of claim 1, wherein said one or more input messages further comprise a mouse input message carrying locations, buttons and applicable trajectory of a mouse.

5. The system of claim 1, wherein said one or more input messages further comprise an audio-visual message delivering instructions to the media content server for responses and operations.

6. The system of claim 1, wherein said one or more input messages further comprise a 3-D coordinate message carrying the information relating to object movement, gesture, or trajectory or interaction.

7. The method of claim 1, wherein said one or more input messages further comprise a USB message supporting a file exchange between the server and one or more remote client devices.

* * * * *